(12) United States Patent
Myllymaki et al.

(10) Patent No.: US 9,085,723 B2
(45) Date of Patent: Jul. 21, 2015

(54) NANODIAMONDS CONTAINING THERMOPLASTIC THERMAL COMPOSITES

(71) Applicant: Carbodeon Ltd Oy, Vantaa (FI)

(72) Inventors: Vesa Myllymaki, Helsinki (FI); Jesse Syren, Helsinki (FI)

(73) Assignee: CARBODEON LTD OY, Vantaa (FI)

( * ) Notice: Subject to any disclaimer, the term of this patent is extended or adjusted under 35 U.S.C. 154(b) by 0 days.

(21) Appl. No.: 14/041,621

(22) Filed: Sep. 30, 2013

(65) Prior Publication Data

US 2014/0091253 A1  Apr. 3, 2014

Related U.S. Application Data

(60) Provisional application No. 61/706,965, filed on Sep. 28, 2012.

(30) Foreign Application Priority Data

Sep. 28, 2012 (FI) .................................. 20126015

(51) Int. Cl.
| | |
|---|---|
| C08G 73/10 | (2006.01) |
| C08F 2/44 | (2006.01) |
| C09K 5/00 | (2006.01) |
| C08F 210/00 | (2006.01) |
| C09K 5/14 | (2006.01) |
| C08K 3/00 | (2006.01) |
| C08K 3/04 | (2006.01) |
| C08K 3/38 | (2006.01) |

(52) U.S. Cl.
CPC ................. *C09K 5/14* (2013.01); *C08K 3/0033* (2013.01); *C08K 3/04* (2013.01); *C08K 3/38* (2013.01); *C08K 2003/382* (2013.01); *C08K 2003/385* (2013.01); *C08K 2201/011* (2013.01)

(58) Field of Classification Search
CPC .......... C08K 5/14; C08K 3/0033; C08K 3/04; C08K 3/08; C08K 3/10; C08K 3/22; C08K 3/34; C08K 3/38; C08K 7/02; C08K 3/14; C08K 2201/011; C08K 2003/385
USPC ....................... 252/75; 526/348; 524/847, 849
See application file for complete search history.

(56) References Cited

U.S. PATENT DOCUMENTS

| | | | |
|---|---|---|---|
| 2010/0022423 A1 | 1/2010 | Lu et al. | |
| 2010/0233465 A1 | 9/2010 | Wu | |
| 2010/0254884 A1* | 10/2010 | Shenderova | ................... 423/446 |
| 2011/0006218 A1* | 1/2011 | Mochalin et al. | .......... 250/459.1 |
| 2011/0040007 A1 | 2/2011 | Chandrasekhar | |

FOREIGN PATENT DOCUMENTS

| | | |
|---|---|---|
| EP | EP 1 502 727 A1 | 2/2005 |
| WO | WO2006058510 A1 | 6/2006 |

OTHER PUBLICATIONS

Xu Tao et al., "TEM and HREM studies on ultradispersed diamonds containing soot formed by explosive detonation", Materials Science and Enginerring B38 (1996) L1-L4.*
Pengwan Chen et al., "Characterization of the condensed carbon in detonation soot", Carbon 41 (2003) 2093-2009.*
Prasad, KE, Extraordinary synergy in the mechanical properties of polymer matrix composites reinforced with 2 nanocarbons, Proc. Natl. Acad. Sci., 2009, pp. 13186-13189, vol. 106, No. 32, U. S. A.
National Board of Patents and Registration of Finland, Search Report, Jun. 25, 2013, pp. 1-5.
International Search Report; PCT/FI2013/050947; Jan. 22, 2014; 4 pages.
Database WPI; Week 200864; Thomson Scientific, London GB; AN 2008-K94722; XP002716788, & WO 2007/148667 A1 (Central Glass Co Ltd) Dec. 27, 2007 (abstract).
Database WPI; Week 201221; Thomson Scientific, London GB; AN 2011-K48218; XP002716789, & KR 2011 0073057 A (Hankook Tire MFG Co) Jun. 29, 2011 (abstract).
Database WPI; Week 201242; Thomson Scientific, London GB; AN 2012-F61892; XP002716790, & KR 2012 0044406 A (Academic Coop Found) May 8, 2012 (abstract).
Database WPI; Week 201252; Thomson Scientific, London GB; AN 2012-E54884; XP0027167901 & KR 2012 0034520 A (Phoenix Materials Co) Apr. 12, 2012 (abstract).
Zhao Y Q et al; "Nanodiamond/poly (lactic acid) nanocomposites: Effect of nanodiamond on structure and properties of poly (lactic acid)", Composites Par B: Engneering, Elsevier, UK, vol. 41 No. 8, Dec. 1, 2010; pp. 646-653, XP027486328, ISSN: 1359-8368, DOI:10.1016/J. COMPOSITEESB.2010.09.003 (retrieved on Nov. 9, 2010) p. 647.
Jee A., Lee M; "thermal and mechanical properties of alkyl-functionalized nanodiamond composites", Current Applied Physics, vol. 11, Mar. 1, 2011, pp. 1183-1187, XP002716792; p. 1184.

* cited by examiner

*Primary Examiner* — William Cheung
(74) *Attorney, Agent, or Firm* — Gearhart Law, LLC

(57) ABSTRACT

The present disclosure provides nanodiamonds containing thermoplastic thermal composites. The nanodiamond containing thermoplastic thermal composite comprises from 0.01 to 80 wt.-% of nanodiamond particles, from 1 to 90 wt.-% of at least one filler, and from 5 to 80 wt.-% of at least one thermoplastic polymer. The present disclosure further relates to a method for manufacturing the nanodiamonds containing thermoplastic thermal composites, and to use of the nanodiamonds containing thermoplastic thermal composites.

24 Claims, No Drawings

NANODIAMONDS CONTAINING THERMOPLASTIC THERMAL COMPOSITES

PRIORITY CLAIM

This application claims priority of the U.S. provisional application No. 61/706,965 and the Finnish national application number 20126015, both filed on Sep. 28, 2012 and both incorporated herein by reference in their entirety.

FIELD OF THE INVENTION

The present invention relates to nanodiamonds containing thermoplastic thermal composites. The present invention further relates to a method for manufacturing nanodiamonds containing thermoplastic thermal composites, and to use of nanodiamond containing thermoplastic thermal composite.

BACKGROUND ART

Heat generated, for example by electronic devices and circuitry must be dissipated to improve reliability and prevent premature failure. Techniques for heat dissipation can include heat sinks and fans for air cooling, and other forms of cooling such as liquid cooling. Depending on the application, the heat sinks can be made of metal, or ceramic materials, but some times also out of polymeric materials. The latter constitute typically thermal greases alike silicones and epoxides thermal interface materials, used typically to adhere the circuits into the device structure itself. When it comes to for example casings of such devices, also thermoplastic thermal composites are used for the overall thermal management throughout the device. The increasing use of polymer materials is based on simple facts of reducing the device weight, and its cost. Moreover, thermally conductive plastics typically boast lower coefficients of thermal expansion (CTE) than for example aluminum and can thereby reduce stresses due to differential expansion, since the plastics more closely match the CTE of silicon or ceramics that they contact. Polymer composites offer also design freedom for molded-in functionality and parts consolidation; and they can eliminate costly post-machining operations. The use of polymeric materials is however limited by their native thermal conductivity properties, reaching typically thermal conductivity values of only around 0.2 W/mK.

For example, miniaturization of electronic chips has become an important topic for development of integrated circuit. Because sizes of electronic elements become smaller, and their operating speeds become faster, how to dissipate the heat generated by an electronic element during operation so as to maintain its working performance and stability has become one of the points for research.

In prior art, several methods to improve thermoplastic polymer thermal conductivity properties are presented. The methods include the use of boron nitride, alumina, graphite, boron carbide and other ceramic materials as additives for improving the thermoplastic polymer thermal conductivity.

Typically, thermal conductivity is measured both in-plane and through-plane of the material, the in-plane conductivity featuring normally higher thermal conductivity values than the through-plane conductivity.

The electric properties of thermal composites can be tuned by selecting either dielectric or electrically conducting filler additives. Typically, the additive total concentrations start from 20% and can be more than 80%. Some of the most advanced thermal composites can contain several of above mentioned fillers.

There are upper limits on present thermoplastic thermal conductivities, and it is difficult to improve these further due to already extremely high filler contents. Excess filler content is detrimental for the polymer composite other important properties, such as mechanical properties.

Therefore there is a need to improve thermoplastic thermal conductivities without increasing the amount of the filler.

Nanodiamond (ND) also referred to as ultrananocrystalline diamond or ultradispersed diamond (UDD) is a unique nanomaterial which can easily be produced in hundreds of kilograms by detonation synthesis.

Detonation nanodiamonds (ND) were first synthesized by researchers from the USSR in 1963 by explosive decomposition of high-explosive mixtures with negative oxygen balance in a non-oxidizing medium. A typical explosive mixture is a mixture of trinitrotoluene (TNT) and hexogen (RDX) and a preferred weight ratio of TNT/RDX is 40/60.

As a result of the detonation synthesis a diamond-bearing soot also referred to as detonation blend is obtained. This blend comprises nanodiamond particles, which typically have an average particle size of about 2 to 8 nm, and different kinds of non-diamond carbon contaminated by metals and metal oxide particles coming from the material of the detonation chamber. The content of nanodiamonds in the detonation blend is typically between 30 and 75% by weight.

The diamond carbon comprises $sp^3$ carbon and the non-diamond carbon mainly comprises $sp^2$ carbon species, for example carbon onion, carbon fullerene shell, amorphous carbon, graphitic carbon or any combination thereof.

For isolating the end diamond-bearing product, use is made of a complex of chemical operations directed at either dissolving or gasifying the impurities present in the material. The impurities, as a rule, are of two kinds: non-carbon (metal oxides, salts etc.) and nondiamond forms of carbon (graphite, black, amorphous carbon).

The use of nanodiamonds in any kind of polymers for thermal management use is currently very limited, and restricted to certain silicone material. Document US 2010/022423 A1 discloses use of nanodiamonds to increase thermal conductivity in polymeric grease. The nanodiamond thermal grease comprises a nanodiamond powder, a thermal powder and a substrate. The nanodiamond powder has volume percentage of 5% to 30%, the thermal powder has volume percentage of 40% to 90%, and the substrate has volume percentage of 5% to 30%. The nanodiamond powder and the thermal powder are distributed uniformly in the substrate to form the nanodiamond thermal grease.

Based on above, there is an emerging need to improve the thermal conductivity of also all the thermoplastic polymer materials, when ever they are used in applications where heat is generated.

The thermoplastic materials can be divided into three main categories, namely standard polymers, engineering polymers and high performance engineering polymers. Moreover, all these categories can be divided into two further morphological sub-groups, namely amorphous, semi-crystalline and crystalline thermoplastic polymers. All these materials also vary in respect to their lipophilic or hydrophilic properties, determined through their polymeric chain structure and contained functional groups therein. The mixing of possible fillers is restricted only to powder form filler materials, the highly viscous thermoplastic materials have to be melt into very high temperatures prior processing, and are not miscible with any solvents. If the added filler materials cannot be distributed evenly into the polymer matrix, but are forming heavy agglomerates in the produced matrix, the use of additives may also result in poorer mechanical and thermal properties as in initial, native polymer material. This problem gets more and more severe, the higher the total content of various fillers in a ready polymer composite is rising.

SUMMARY OF THE INVENTION

The present invention relates to a nanodiamond containing thermoplastic thermal composite comprising from 0.01 to 80 wt.-% of nanodiamond particles; from 1 to 90 wt.-% of at least one filler; and from 5 to 80 wt.-% of at least one thermoplastic polymer.

The present invention further relates to a process for manufacturing a nanodiamond containing thermoplastic thermal composite comprising from 0.01 to 80 wt.-% of nanodiamond particles; from 1 to 90 wt.-% of at least one filler; and from 5 to 80 wt.-% of at least one thermoplastic polymer wherein said nanodiamond particles, said at least one filler, and said at least one thermoplastic polymer are compounded and molded at elevated temperature to form said nanodiamond containing thermoplastic thermal composite.

The present invention further relates to use of nanodiamond containing thermoplastic thermal composite comprising from 0.01 to 80 wt.-% of nanodiamond particles; from 1 to 90 wt.-% of at least one filler; and from 5 to 80 wt.-% of at least one thermoplastic polymer in devices containing a heat producing source, preferably in electronic devices and automobiles.

It has now been surprisingly found that addition of nanodiamond particles to a thermoplastic thermal composite, which contain filler(s) and thermoplastic polymer(s), improve thermal conductivity properties of the composite without affecting detrimentally other important properties, such as mechanical properties.

The improvement of thermal conductivity properties is believed to result from percolation phenomena. In one preferred embodiment of the invention hexagonal shaped filler particles are in plane and spherical nanodiamond particles fill the gaps between the hexagonal shaped filler particles, thus improving the thermal conductivity, especially through-plane thermal conductivity. In another preferred embodiment of invention, the nanodiamond particles differ largely in size of the other filler or fillers contained in the final thermoplastic composite, the size of other filler being preferably at least 10-fold as compared to size of nanodiamond primary particle size.

A nanodiamond containing thermoplastic thermal composite according to the present invention comprises from 0.01 to 80 wt.-% of nanodiamond particles, from 1 to 90 wt.-% of at least one filler, and from 5 to 80 wt.-% of at least one thermoplastic polymer.

DETAILED DESCRIPTION OF THE INVENTION

The nanodiamond containing thermoplastic thermal composite according to the first aspect of the present invention comprises from 0.01 to 80 wt.-% of nanodiamond particles, from 1 to 90 wt.-% of at least one filler, and from 5 to 80 wt.-% of at least one thermoplastic polymer.

In a preferred embodiment the nanodiamond containing thermoplastic thermal composite comprises from 0.03 to 80 wt.-%, preferably from 0.1 to 80 wt.-%, more preferably from 0.2 to 40 wt.-%, and most preferably from 0.4 to 20 wt.-% of the nanodiamond particles.

In another preferred embodiment the nanodiamond containing thermoplastic thermal composite comprises from 1 to 90 wt.-%, preferably from 10 to 70 wt.-%, and most preferably 20 to 50 wt.-%, of the at least one filler.

Yet in another preferred embodiment the nanodiamond containing thermoplastic thermal composite comprises from 5 to 80 wt.-%, preferably from 10 to 70 wt.-%, and most preferably from 30 to 60 wt.-% of the at least one thermoplastic polymer.

The nanodiamond particles may be substantially in single digit form or in agglomerated form, preferably in single digit form. The nanodiamond particles are preferably such that have good affinity to thermoplastic polymer(s) and/or to filler(s).

The nanodiamond particles have an average primary particle size of from 1 nm to 10 nm, preferably from 2 nm to 8 nm, more preferably from 3 nm to 7 nm, and most preferably from 4 nm to 6 nm.

The nanodiamond particles of the nanodiamond containing thermoplastic thermal composite of the present invention are detonation nanodiamonds which are produced by detonation process.

The particle size of the agglomerated form is between 5 nm and 1000 nm, preferably between 60 nm and 800 nm.

In one embodiment of the present invention the nanodiamond particles may include detonation soot such as graphitic and amorphous carbon, the content of oxidisable carbon preferably being at least 5 wt.-%, more preferably at least 10 wt.-%.

In another embodiment the nanodiamond particles are essentially pure nanodiamond particles, preferably having a nanodiamond content of at least 50 wt.-%, more preferably at least 95 wt.-%, and most preferably at least 97 wt.-%.

The nanodiamond containing thermoplastic thermal composite of the present invention comprises one or more fillers. The filler is thermally conductive material. The filler material comprises metal, metal oxide, metal nitride, carbon compound, silicon compound, boron compound, ceramic materials, natural fibers, or the combinations thereof.

In one preferred embodiment, the metal oxide filler is aluminum oxide.

In one preferred embodiment, the metal nitride filler is aluminum nitride.

The carbon compound comprises graphite, carbon black, carbon fiber, graphene, oxidized graphene, carbon soot, silicon carbide, aluminum carbide, or the combinations thereof.

The boron compound comprises hexagonal or cubic boron nitride or boron carbide, or the combinations thereof.

In one preferred embodiment the filler is boron compound, preferably boron nitride.

In one preferred embodiment the filler is hexagonal shaped.

The nanodiamond containing thermoplastic thermal composite of the present invention comprises one or more thermoplastic polymers. The thermoplastic polymer can be any thermoplastic polymer. The thermoplastic polymer comprises Acrylonitrile butadiene styrene, Acrylic, Celluloid, Cellulose acetate, Cyclic Olefin Copolymer, Ethylene-Vinyl Acetate, Ethylene vinyl alcohol, Fluoroplastics such as polytetrafluoro ethylene, Ionomers, Liquid Crystal Polymer, Polyoxymethylene, Polyacrylates, Polyacrylonitrile, Polyamide, Polyamide-imide, Polyimide, Polyaryletherketone, Polybutadiene, Polybutylene, Polybutylene terephthalate, Polycaprolactone, Polychlorotrifluoroethylene, Polyether ether ketone, Polyethylene terephthalate, Poly-cyclohexylene dimethylene terephthalate, Polycarbonate, Polyhydroxyalkanoates, Polyketone, Polyester, Polyethylene, Polyetherketoneketone, Polyetherimide, Polyethersulfone, Polysulfone, Chlorinated Polyethylene, Polylactic acid, Polymethylmethacrylate, Polymethylpentene, Polyphenylene, Polyphenylene oxide, Polyphenylene sulfide, Polyphthalamide, Polypropylene, Polystyrene, Polysulfone, Polytrimethylene terephthalate, Polyurethane, Polyvinyl acetate, Polyvinyl chloride, Polyvinylidene chloride, and Styrene-acrylonitrile, or the combinations thereof.

Preferably the thermoplastic polymer is Acrylonitrile butadiene styrene, Polyphenylene sulfide, Liquid Crystal Polymer, Polypropylene, Polyethylene, Polystyrene, Polysulfone, Polyetherimide, Polytrimethylene terephthalate, Polycarbonate, Polyamide, Polyphthalamide, and Polyether ether ketone, or the combinations thereof.

The thermoplastic polymer can be crystalline, semi-crystalline or amorphous.

In a preferred embodiment, the nanodiamond particles and the at least one filler are distributed uniformly in the at least one thermoplastic polymer, so that the nanodiamond containing thermoplastic thermal composite has high thermal conductivity.

According to the second aspect of the present invention, the present invention pertains to a process for manufacturing the nanodiamond containing thermoplastic thermal composite.

The nanodiamond particles, the at least one filler, and the at least one thermoplastic polymer are compounded and molded at elevated temperature to form the nanodiamond containing thermoplastic thermal composite.

The compounding and molding is performed at elevated temperature. The temperature depends on the used thermoplastic polymer(s).

In one embodiment of the present invention temperatures between 290 and 335° C. may be used in the case of polyphenylene sulfide.

The molding may be performed with any known technique, such as injection molding, compression molding and rotational molding. Preferably the molding is injection molding.

The nanodiamond containing thermoplastic thermal composite may be in different forms, such as articles, pellets and powder.

According to the third aspect of the present invention, the present invention relates to use of the nanodiamond containing thermoplastic thermal composite.

The nanodiamond containing thermoplastic thermal composite is used in applications/devices containing a heat producing source. Such applications/devices are, for example, electronic devices and automobiles.

EXAMPLES

In the following the invention will be described in more detail by means of examples. The purpose of the examples is not to restrict the scope of the claims.

Example 1

Materials
Polyphenylene Sulphide (PPS):
  PPS used in the tests was PPS grade Fortron 0203B6 (powder PPS), which is commercially available.
Boron Nitride:
  Boron nitride used in the examples was 10 micrometer hexagonal boron nitride powder available from company Goodfellow and other commercial sources.
Blend Nuevo
  Product named "Blend Nuevo" (from company Carbodeon) contains both hexagonal graphitic fraction as well as spherical nanodiamond particles. Nanodiamond crystal size is 4-6 nm. Nanodiamond content in solid phase is ≥50 wt.-%. "Blend Nuevo" is commercially available. The nanodiamond particles of "Blend Nuevo" are detonation nanodiamonds.

Molto Nuevo
  Nanodiamond crystal size in product named "Molto Nuevo" (from company Carbodeon) is 4-6 nm. Nanodiamond content is >97 wt.-%. "Molto Nuevo" is commercially available. The nanodiamond particles of "Molto Nuevo" are detonation nanodiamonds.
Compounds
  In Table 1 are presented tested compounds.

TABLE 1

Tested compounds.

| Code | Filler and/or nanodiamond | Thermoplastic polymer | Filler concentration (wt %), in the final composite |
|---|---|---|---|
| Ref. | | PPS | |
| GF-1 | Boron nitride | PPS | 20 |
| GF-2 | Boron nitride | PPS | 45 |
| GF-3 | Blend Nuevo | PPS | 20 |
| GF-4 | Blend Nuevo | PPS | 45 |
| GF-5 | Boron nitride + Blend Nuevo | PPS | 40 + 5 |
| GF-6 | Boron nitride + Molto Nuevo | PPS | 40 + 5 |

Processing
  Compounding was done with Xplore15 micro-compounder and test pieces were injection molded with Thermo-Haake Minijet. Special mold (5*23*23 mm) was purchased for Minijet. Two similar composites of each series were produced for subsequent thermal conductivity analyses.

The filler, nanodiamonds and thermoplastic polymer were placed in the compounder. Temperature of compounding and moulding was 315° C. (295° C. with GF-1 and 330° C. with GF-2). Rotation speed of the screws in compounding was 100 rpm and time of compounding was minimum 5 minutes. Temperature of the mould was 135° C. Packing time with 1000 bar was 5 seconds and cooling time with 700 bar was 15 seconds with minijet. All material were dried prior compounding (PPS: 2 h/120° C. in a dry air dryer, Blend Nuevo and Molto Nuevo minimum 14 h/200° C. in a heating oven).
Analyses
  The primary test was thermal conductivity (through-plane).

Thermal conductivity measurements were through-plane thermal conductivity measurements, and were made in environmentally controlled room (23° C./50 RH%). Samples were slightly polished up. Measurement was made with Hot Disk machine and with a sensor C5465 (radar 3,189 mm). All samples were measured using at least two power-time—combination technique. Output data was used to calculate thermal conductivity, Fine Tuned—method was utilized. Used power-time combinations for each compound are shown in Table 2.

TABLE 2

Power-time combinations used to calculate thermal conductivity.

| Code | Power (mW) | Time (s) |
|---|---|---|
| Ref | 20 | 40 |
| GF-1 | 60 | 5 |
| GF-2 | 100 | 3 |
| GF-3 | 30 | 20 |
| GF-5 | 150 | 2 |
| GF-6 | 100 | 3 |

Results

Results are presented in Table 3.

TABLE 3

Results of thermal conductivity measurements.

| Code | Heat conductivity (W/mK) |
|---|---|
| Ref. | 0.21 |
| GF-1 | 0.65 |
| GF-2 | 1.10 |
| GF-3 | 0.31 |
| GF-4 |  |
| GF-5 | 1.41 |
| GF-6 | 1.32 |

Thermal conductivity gave the best result when 40 wt.-% of boron nitride +5 wt.-% of Blend Nuevo were used in PPS. Table 3 shows that thermal conductivity of boron nitride-PPS—compound was increased when part of boron nitride was replaced with nanodiamonds.

Example 2

Materials
Polyamide-66 (PA-66):
PA-66 used in the tests was PA-66 grade Zytel 135F (powder PA-66), which is commercially available.
Boron Nitride:
Boron nitride used in the example was 15 micrometer hexagonal boron nitride powder Boronid® TCP015-100 available from ESK Ceramics GmbH.
Molto Nuevo
Product named "Molto Nuevo" (from company Carbodeon) contains spherical nanodiamond particles with high degree of amine functionalization on nanodiamond particle surface. Nanodiamond crystal size is 4-6 nm. Nanodiamond content in solid phase is ≥97 wt.-%. "Molto Nuevo" is commercially available. The nanodiamond particles of "Molto Nuevo" are detonation nanodiamonds.
Vox P
Product named "Vox P" (from company Carbodeon) contains spherical nanodiamond particles with predominantly carboxylic acid functionalized nanodiamond surface. Nanodiamond crystal size is 4-6 nm. Nanodiamond content in solid phase is ≥97 wt.-%. "Vox P" is commercially available. The nanodiamond particles of "Vox P" are detonation nanodiamonds.
Hydrogen P
Product named "Hydrogen P" (from company Carbodeon) contains spherical nanodiamond particles with predominantly hydrogen functionalized nanodiamond surface. Nanodiamond crystal size is 4-6 nm. Nanodiamond content in solid phase is ≥97 wt.-%. The nanodiamond particles of "Hydrogen P" are detonation nanodiamonds.
Processing
Compounding was done with Xplore 15 micro-compounder and test pieces were injection molded with Thermo-Haake Minijet. Special mold (25*25*3 mm) was used for Minijet. Three similar composites of each series were produced for subsequent thermal conductivity and density analyses.
Samples 1-2: The boron nitride powder and PA-66 thermoplastic polymer were placed in the compounder. Temperature of compounding and moulding was 290° C. Rotation speed of the screws in compounding was 100 rpm and time of compounding was minimum 5 minutes. Temperature of the mould was 70° C. Packing time with 800 bar was 5 seconds and cooling time with 500 bar was 15 seconds with minijet. The samples total weight was 11 grams each, and the total filler loading was either 20 wt. % (Sample 1) or 45 wt. % (Sample 2). Samples 1 and 2 represent reference samples containing boron nitride filler only.

Sample 3: The PA-66 thermoplastic polymer was placed in the compounder, applying conditions as depicted for samples 1-2. Sample 3 is a reference sample containing no fillers.

Samples 9-16: The nanodiamond powder and PA-66 thermoplastic polymer were compounded as depicted for samples 1-2. The boron nitride filler was then compounded into a nanodiamond contained PA-66 as similar, subsequent step. Also here, the compounding took place as depicted for samples 1-2. The samples total weight was 11 grams each, and the total filler loading was either 20 wt. % or 45 wt. %. When the sample total filler loading was 20 wt. % of the prepared sample, the boron nitride filler loading was varied between 18.5 to 19.9 wt. %, and the nanodiamond concentration was varied between 0.1 to 1.5 wt. % of the sample total weight. When the sample total filler loading was 45 wt. % of the prepared sample, the boron nitride filler loading was varied between 43.5 to 44.9 wt. %, and the nanodiamond concentration was varied between 0.1 to 1.5 wt. % of the sample total weight.

Samples 17, 18, 19, 23, 24, 25, 29, 31 and 33: The nanodiamond powder and boron nitride fillers were mixed together by ball milling, applying Retzch 100 PM100 ball milling tool (30 minutes, 200 rpm; wolfram carbide balls (10 mm), wolfram carbide container). The resulting boron nitride-nanodiamond powder mixes were placed in the compounder. Rotation speed of the screws in compounding was 100 rpm and time of compounding was minimum 5 minutes. The samples total weight was 11 grams each, and the total filler loading was either 20 wt. % or 45 wt. %. When the sample total filler loading was 20 wt. % of the prepared sample, the boron nitride filler loading was varied between 18.5 to 19.9 wt. %, and the nanodiamond concentration between was varied between 0.1 to 1.5 wt. % of the sample total weight. When the sample total filler loading was 45 wt. % of the prepared sample, the boron nitride filler loading was varied between 43.5 to 44.9 wt. %, and the nanodiamond concentration was varied between 0.1 to 1.5 wt. % of the sample total weight.

All materials were dried prior compounding (PA-66: 2 h/120° C. in a dry air dryer, Molto Nuevo and Vox P minimum 14 h/120° C. in a heating oven).
Analyses The manufactured PA-66 thermal compound samples thermal conductivities ($\lambda$) were determined by laser flash method (ISO 18755; LFA 447, Netzsch GmbH), at ESK Ceramics GmbH, and as a reference material Pyroceram was used (5 measurements and averaging). The measured value is thermal diffusivity a, which value is measured in three spatial directions, i.e. x, y, and z directions (through-plane=z-sample, in-plane parallel to the molding direction=y-sample, in-plane perpendicular to the molding direction=x-sample). The measurements were carried out at room temperature (25° C.). The sample densities ($\rho$) were measured by the Archimedes method. The measurement on the z-sample was used to calculate the specific heat $C_P$. Using the density $\rho$, $C_P$, and a, the thermal conductivity was calculated according to $\lambda = a \cdot C_P \cdot \rho$.
Results The results are summarized in Table 4. Error of density measurements is ±0.002 g/cm³, error of thermal diffusivity measurement is ±5% and an error of calculated $C_P$, is up to 15%. Each sample specific heat values were the same for x, y and z directions and thus, only one value for each specific sample is represented.

TABLE 4

Results.

| Composites | Sample Nr. | BN % wt. % | ND wt. % | ND type | PA-66% wt. % | Density g/cm3 | Thermal diffusivity mm2/s | Specific heat J/g/K | Thermal conductivity W/m · K |
|---|---|---|---|---|---|---|---|---|---|
| References | 1 | 20.0 | | | 80.0 | | X: 0.595; Y: 0.641; Z: 0.322 | 1.44 | X: 1.09 Y: 1.17 Z: 0.59 |
| | 2 | 45.0 | | | 55.0 | | X: 1.861; Y: 1.927; Z: 0.940 | 1.28 | X: 3.46 Y: 3.58 Z: 1.75 |
| | 3 | | | | 100 | 1.126 | X: 0.210; Y: 0.185; Z: 0.186 | 1.54 | X: 0.35 Y: 0.32 Z: 0.32 |
| Samples | 9 | 19.9 | 0.1 | Molto Nuevo | 80.0 | 1.254 | X: 0.578; Y: 0.643; Z: 0.320 | 1.38 | X: 1.00 Y: 1.11 Z: 0.55 |
| | 10 | 19.5 | 0.5 | Molto Nuevo | 80.0 | 1.265 | X: 0.607; Y: 0.647; Z: 0.342 | 1.39 | X: 1.07 Y: 1.14 Z: 0.60 |
| | 11 | 18.5 | 1.5 | Molto Nuevo | 80.0 | 1.263 | X: 0.593; Y: 0.638; Z: 0.334 | 1.37 | X: 1.02 Y: 1.10 Z: 0.58 |
| | 12 | 18.5 | 1.5 | Vox P | 80.0 | 1.265 | X: 0.583; Y: 0.642; Z: 0.318 | 1.44 | X: 1.06 Y: 1.17 Z: 0.58 |
| | 13 | 44.9 | 0.1 | Molto Nuevo | 55.0 | 1.457 | X: 0.926; Y: 2.082; Z: 0.926 | 1.37 | X: 1.85 Y: 4.17 Z: 1.85 |
| | 14 | 44.5 | 0.5 | Molto Nuevo | 55.0 | 1.457 | X: 1.975; Y: 2.348; Z: 1.033 | 1.41 | X: 4.06 Y: 4.52 Z: 2.12 |
| | 15 | 43.5 | 1.5 | Molto Nuevo | 55.0 | 1.464 | X: 1.747; Y: 2.217; Z: 0.936 | 1.36 | X: 3.48 Y: 4.42 Z: 1.87 |
| | 16 | 43.5 | 1.5 | Vox P | 55.0 | 1.458 | X: 1.928; Y: 1.985; Z: 0.974 | 1.32 | X: 3.70 Y: 3.81 Z: 1.87 |
| | 17 | 19.9 | 0.1 | Molto Nuevo | 80.0 | 1.262 | X: 0.661; Y: 0.703; Z: 0.338 | 1.47 | X: 1.23 Y: 1.30 Z: 0.63 |
| | 18 | 19.5 | 0.5 | Molto Nuevo | 80.0 | 1.257 | X: 0.629; Y: 0.686; Z: 0.336 | 1.46 | X: 1.17 Y: 1.26 Z: 0.63 |
| | 19 | 18.5 | 1.5 | Molto Nuevo | 80.0 | 1.262 | X: 0.625; Y: 0.664; Z: 0.326 | 1.39 | X: 1.09 Y: 1.16 Z: 0.57 |
| | 23 | 44.9 | 0.1 | Molto Nuevo | 55.0 | 1.449 | X: 2.131; Y: 2.491; Z: 1.152 | 1.31 | X: 4.06 Y: 4.74 Z: 2.19 |
| | 24 | 44.5 | 0.5 | Molto Nuevo | 55.0 | 1.444 | X: 1.934; Y: 2.141; Z: 0.974 | 1.35 | X: 3.77 Y: 4.17 Z: 1.90 |
| | 25 | 43.5 | 1.5 | Molto Nuevo | 55.0 | 1.445 | X: 2.055; Y: 2.204; Z: 0.892 | 1.45 | X: 4.29 Y: 4.60 Z: 1.86 |
| | 29 | 18.5 | 1.5 | Vox P | 80.0 | 1.261 | X: 0.666; Y: 0.746; Z: 0.337 | 1.52 | X: 1.28 Y: 1.43 Z: 0.65 |
| | 31 | 43.5 | 1.5 | Vox P | 55.0 | 1.457 | X: 0.640; Y: 2.300; Z: 1.044 | 1.34 | X: 1.25 Y: 4.47 Z: 2.03 |
| | 33 | 18.5 | 1.5 | Hydrogen P | 80.0 | 1.15 | X: 0.685; Y: 0.747; Z: 0.337 | 1.66 | X: 1.31 Y: 1.42 Z: 0.64 |

From the results it can be seen that already minor additions of nanodiamond materials can markedly improve both in-plane (x and y) and through-plane thermal conductivities. Also way of introducing nanodiamond material into the compound is having an impact on product final thermal conductivity properties. It has been shown that milling nanodiamond filler together with boron nitride filler by ball milling prior introducing the resulting filler mix into thermoplastic polymer itself is often times improving the thermal conductivities as compared to a method, where fillers are added separately to thermoplastic matrix. Whilst no measurable improvements in thermal conductivity were seen as adding 0.1 wt. % of Molto Nuevo powder into PA-66 matrix, followed by addition of 19.9 wt. % Boronid boron nitride filler (sample 9), a 6.8% improvement in average through-plane thermal conductivity (x, y), and over 5% improvement in overall thermal conductivity (x, y, z) could be detected (sample 17). Whilst adding 0.1 wt. % of Molto Nuevo powder together with 44.9 wt. % of boron nitride filler (ball milled together) into PA-66 polymer (sample 23), an improvement in overall thermal conductivity (x, y, z) of 24.9% could be received. Herein, the improvement in through-plane thermal conductivity was 25.1%. The corresponding sample (13) did not show any practical improvements in thermal conductivities. Also minor additions of Vox P (1.5 wt. %) ball milled together with 18.5 wt. % of boron nitride filler were able to improve all measured thermal conductivities (19.4% in average in-plane thermal conductivity and 17.9% average overall thermal conductivity), whilst the sample 12 prepared by subsequent filler addition gave only modest improvements in thermal conductivities. As applying the hydrogenated nanodiamond powder "Hydrogen P" (sample 33), the results were in line with that of similarly conditioned "Vox P" in sample 29.

The invention claimed is:

1. A nanodiamond containing thermoplastic thermally conductive composite comprising:
   from 0.01 to 80 wt.-% of nanodiamond particles;
   from 1 to 90 wt.-% of at least one filler; and
   from 5 to 80 wt.-% of at least one thermoplastic polymer;
   wherein said at least one filler is thermally conductive material wherein the thermally conductive composite exhibits different thermal conductivity at x, y, and z directions and the thermal conductivity at z direction is at least 1.00 W/m·K.

2. The nanodiamond containing thermoplastic thermally conductive composite according to claim 1, wherein said composite comprises from 0.03 to 80 wt.-% of said nanodiamond particles.

3. The nanodiamond containing thermoplastic thermally conductive composite according to claim 1, wherein said composite comprises from 0.1 to 80 wt.-% of said nanodiamond particles.

4. The nanodiamond containing thermoplastic thermally conductive composite according to claim 1, wherein said composite comprises from 0.2 to 40 wt.-% of said nanodiamond particles.

5. The nanodiamond containing thermoplastic thermally conductive composite according to claim 1, wherein said composites comprises from 0.4 to 20 wt.-% of said nanodiamond particles.

6. The nanodiamond containing thermoplastic thermally conductive composite according to claim 1, wherein said nanodiamond particles have an average primary particle size from 1 nm to 10 nm.

7. The nanodiamond containing thermoplastic thermally conductive composite according to claim 1, wherein said nanodiamond particles have an average primarily particle size from 2 nm to 8 nm.

8. The nanodiamond containing thermoplastic thermally conductive composite according to claim 1, wherein said nanodiamond particles have an average primary particle size from 3 nm to 7 nm.

9. The nanodiamond containing thermoplastic thermally conductive composite according to claim 1, wherein said nanodiamond particles have an average primary particle size, from 4 nm to 6 nm.

10. The nanodiamond containing thermoplastic thermally conductive composite according to claim 1, wherein said nanodiamond particles include detonation soot.

11. The nanodiamond containing thermoplastic thermally conductive composite according to claim 10, wherein detonation soot is graphitic and amorphous carbon.

12. The nanodiamond containing thermoplastic thermally conductive composite according to claim 1, wherein said nanodiamond particles are essentially pure nanodiamond particles.

13. The nanodiamond containing thermoplastic thermally conductive composite according to claim 1, wherein said composite comprises from 10 to 70 wt.-% of said at least one filler.

14. The nanodiamond containing thermoplastic thermally conductive composite according to claim 1, wherein said composite comprises from 20 to 50 wt.-% of said at least one filler.

15. The nanodiamond containing thermoplastic thermally conductive composite according to claim 1, wherein said composite comprises from 10 to 70 wt.-% of said at least one thermoplastic polymer.

16. The nanodiamond containing thermoplastic thermally conductive composite according to claim 1, wherein said composite comprises from 30 to 60 wt.-% of said at least one thermoplastic polymer.

17. The nanodiamond containing thermoplastic thermally conductive composite according to claim 1, wherein said filler comprises metal, metal oxide, metal nitride, carbon compound, silicon compound, boron compound, ceramic materials, natural fibers, or combinations thereof.

18. The nanodiamond containing thermoplastic thermally conductive composite of claim 17, wherein said carbon compound comprises graphite, carbon black, carbon fiber, graphene, oxidized graphene, carbon soot, silicon carbide, aluminum carbide, or combinations thereof.

19. The nanodiamond containing thermoplastic thermally conductive composite of claim 17, wherein said boron compound comprises hexagonal or cubic boron nitride, boron carbide, or combinations thereof.

20. The nanodiamond containing thermoplastic thermally conductive composite according to claim 1, wherein said thermoplastic polymer is selected from the group consisting of Acrylonitrile butadiene styrene, Acrylic, Celluloid, Cellulose acetate, Cyclic Olefin Copolymer, Ethylene-Vinyl Acetate, Ethylene vinyl alcohol, Fluoroplastics, Ionomers, Liquid Crystal Polymer, Polyoxymethylene, Polyacrylates, Polyacrylonitrile, Polyamide, Polyamide-imide, Polyimide, Polyaryletherketone, Polybutadiene, Pbutylene, Polybutylene terephthalate, Polycaprolactone, Polychlorotrifluoroethylene, Polyether ether ketone, Polyethylene terephthalate, Polycyclohexylene dimethylene terephthalate, Polycarbonate, Polyhydroxyalkanoates, Polyketone, Polyester, Polyethylene, Polyetherketoneketone, Polyetherimide, Polyethersulfone, Polysulfone, Chlorinated Polyethylene, Polylactic acid, Polymethylmethacrylate, Polymethylpentene, Polyphenylene, Polyphenylene oxide, Polyphenylene sulfide, Polyphthalamide, Polypropylene, Polystyrene, Polysulfone, Polytrimethylene terephthalate, Polyurethane, Polyvinyl acetate, Polyvinyl chloride, Polyvinylidene chloride, Styrene-acrylonitrile and combinations thereof.

21. The nanodiamond containing thermoplastic thermally conductive composite according of claim 20, wherein the fluoroplastic is polytetrafluoroethylene.

22. The nanodiamond containing thermoplastic thermally conductive composite according to claim 1, wherein said thermoplastic polymer is in crystal, semi-crystal or amorphous form.

23. A process for manufacturing said nanodiamond containing thermoplastic thermally conductive composite according to claim 1, wherein said nanodiamond particles, said at least one filler, and said at least one thermoplastic polymer are compounded and molded at elevated temperature to form said nanodiamond containing thermoplastic thermally conductive composite, wherein said filler is thermally conductive material.

24. A nanodiamond containing thermoplastic thermally conductive composite comprising:
from 0.01 to 80 wt.-% of nanodiamond particles;
from 1 to 90 wt.-% of at least one filler; and
from 5 to 80 wt.-% of at least one thermoplastic polymer,
wherein the thermally conductive composite is a part of an electronic device or an automobile, and wherein said filler is thermally conductive material.

* * * * *

UNITED STATES PATENT AND TRADEMARK OFFICE
CERTIFICATE OF CORRECTION

| | | |
|---|---|---|
| PATENT NO. | : 9,085,723 B2 | Page 1 of 1 |
| APPLICATION NO. | : 14/041621 | |
| DATED | : July 21, 2015 | |
| INVENTOR(S) | : Vesa Myllymaki et al. | |

It is certified that error appears in the above-identified patent and that said Letters Patent is hereby corrected as shown below:

Columns 9-10, Claim 1, should read as follows :

1. A nanodiamond containing thermoplastic thermally conductive composite comprising:
   from 0.01 to 80 wt.-% of nanodiamond particles;
   from 1 to 90 wt.-% of at least one filler; and
   from 5 to 80 wt.-% of at least one thermoplastic polymer;
      wherein said at least one filler is thermally conductive
         material wherein the thermally conductive composite
         exhibits different thermal conductivity at x, y, and z directions and the thermal conductivity
         at z direction is at least 0.55 W/m·K.

Signed and Sealed this
Fifteenth Day of December, 2015

Michelle K. Lee
*Director of the United States Patent and Trademark Office*